United States Patent
Hiasa

(10) Patent No.: US 11,600,025 B2
(45) Date of Patent: Mar. 7, 2023

(54) IMAGE PROCESSING METHOD, IMAGE PROCESSING APPARATUS, IMAGE PROCESSING SYSTEM, AND LEARNT MODEL MANUFACTURING METHOD

(71) Applicant: CANON KABUSHIKI KAISHA, Tokyo (JP)

(72) Inventor: Norihito Hiasa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 209 days.

(21) Appl. No.: 16/826,370

(22) Filed: Mar. 23, 2020

(65) Prior Publication Data

US 2020/0311981 A1 Oct. 1, 2020

(30) Foreign Application Priority Data

Mar. 29, 2019 (JP) .............................. JP2019-067279

(51) Int. Cl.
*G06T 9/00* (2006.01)
*G06T 5/00* (2006.01)
*H04N 5/235* (2006.01)
*H04N 5/355* (2011.01)
*H04N 23/741* (2023.01)
*H04N 25/57* (2023.01)

(52) U.S. Cl.
CPC .............. *G06T 9/002* (2013.01); *G06T 5/007* (2013.01); *H04N 23/741* (2023.01); *H04N 25/57* (2023.01)

(58) Field of Classification Search
CPC ....... G06T 9/002; G06T 5/007; H04N 5/2355; H04N 5/355; G06K 9/00523; G06K 9/6267; G06N 3/08
See application file for complete search history.

(56) References Cited

U.S. PATENT DOCUMENTS

2013/0004825 A1  1/2013  Kogure

FOREIGN PATENT DOCUMENTS

| JP | 2013016275 A | 1/2013 |
| JP | 2016110232 A | 6/2016 |

OTHER PUBLICATIONS

Lee, S.H., Park, H.M. and Hwang, S.Y., 2012. Motion deblurring using edge map with blurred/noisy image pairs. Optics Communications, 285(7), pp. 1777-1786.*
Wei, C., Wang, W., Yang, W. and Liu, J., 2018. Deep retinex decomposition for low-light enhancement. arXiv preprint arXiv: 1808.04560.*
Eilertsen, G., Kronander, J., Denes, G., Mantiuk, R.K. and Unger, J., 2017. HDR image reconstruction from a single exposure using deep CNNs. ACM transactions on graphics (TOG), 36(6), pp. 1-15.*

(Continued)

*Primary Examiner* — Zhitong Chen
(74) *Attorney, Agent, or Firm* — Rossi, Kimms & McDowell LLP

(57) ABSTRACT

An image processing method comprising steps of obtaining a first map representing a region outside a dynamic range of an input image based on a signal value in the input image and a threshold of the signal value, and inputting input data including the input image and the first map and executing a recognition task or a regression task.

18 Claims, 15 Drawing Sheets

(56) References Cited

OTHER PUBLICATIONS

Whyte, O., Sivic, J. and Zisserman, A., 2014. Deblurring shaken and partially saturated images. International journal of computer vision, 110(2), pp. 185-201.*

Zhang, K., Zuo, W. and Zhang, L., 2018. FFDNet: Toward a fast and flexible solution for CNN-based image denoising. IEEE Transactions on Image Processing, 27(9), pp. 4608-4622.*

Extended European Search Report issued in European Appln. No. 20165811.9 dated Jul. 31, 2020.

Pan. "Robust Kernel Estimation with Outliers Handling for Image Deblurring". IEEE Conference on Computer Vision and Pattern Recognition. 2016: 2800-2808.

Wei. "Deep Retinex Decomposition for Low-Light Enhancement". arXiv:1808.04560v1 [cs.CV] Aug. 14, 2018. Pages 1-12.

Zhang. "FFDNet: Toward a Fast and Flexible Solution for CNN based Image Denoising". arXiv:1710.04026v2 [cs.CV] May 22, 2018. pp. 1-15.

Whyte. "Deblurring Shaken and Partially Saturated Images". IEEE International Conference on Computer Vision Workshops. 2011: 745-752.

Office Action issued in European Appln. No. 20165811.9 dated Mar. 3, 2022.

Eppel "Setting an attention region for convolutional neural networks using region selective features, for recognition of materials within glass vessels" arxiv.org, Aug. 29, 2017:pp. 1-20. XP055637030.

Ronneberger. "U-Net: Convolutional Networks for Biomedical Image Segmentation." arXiv:1505.04597v1 [cs.CV] May 18, 2015. pp. 1-8.

* cited by examiner

IMAGE PROCESSING METHOD, IMAGE PROCESSING APPARATUS, IMAGE PROCESSING SYSTEM, AND LEARNT MODEL MANUFACTURING METHOD

BACKGROUND OF THE INVENTION

Field of the Invention

The present invention relates to an image processing method that can suppress a decrease in estimation accuracy of a neural network.

Description of the Related Art

Japanese Patent Laid-Open No. ("JP") 2016-110232 discloses a method for determining a position of a recognition target in an image with high accuracy using a neural network.

However, the method disclosed in JP 2016-110232 reduces the determination accuracy when the image has a luminance saturated area or a blocked-up shadow area. The luminance saturated area or the blocked-up shadow area may occur in an image depending on a dynamic range of the image sensor and exposure during imaging. In the luminance saturated area or the blocked-up shadow area, it may be impossible to obtain information on a configuration in an object space, and a false edge that does not originally exist may appear at a boundary between the areas. This results in an extraction of a feature value different from an original value of the object, which reduces the estimation accuracy.

SUMMARY OF THE INVENTION

The present invention provides an image processing method, an image processing apparatus, an image processing system, and a learnt model manufacturing method, each of which can suppress a decrease in estimation accuracy of a neural network even when luminance saturation or a blocked-up shadow occurs.

An image processing method as one aspect of the present invention includes steps of obtaining a first map representing a region outside a dynamic range of an input image based on a signal value in the input image and a threshold of the signal value, and inputting input data including the input image and the first map and executing a recognition task or a regression task.

An image processing apparatus configured to perform the above image processing method, and a storage medium storing a computer program that enables a computer to execute the above image processing method also constitute another aspect of the present invention.

An image processing system as one aspect of the present invention includes a first apparatus and a second apparatus communicable with the first apparatus. The first apparatus includes a transmitter configured to transmit a request to make the second apparatus execute processing on a captured image. The second apparatus includes a receiver configured to receive the request transmitted by the transmitter, an obtainer configured to obtain a first map representing a region outside a dynamic range of the captured image based on a signal value in the captured image and a threshold of the signal value, a processor configured to input data including the captured image and the first map to a neural network and to execute a recognition task or a regression task, and a transmitter configured to transmit a result of the task.

An image processing method as one aspect of the present invention comprising steps of obtaining a training image, a first map representing a region outside a dynamic range of the training image based on a signal value in the training image and a threshold of the signal value, and ground truth data, and making a neural network learn for executing a recognition task or a regression task, using input data including the training image and the first map, and the ground truth data.

A storage medium storing a computer program that enables a computer to execute the above image processing method also constitute another aspect of the present invention.

A learnt model manufacturing method as one aspect of the present invention includes steps of obtaining a training image, a first map representing a region outside a dynamic range of the training image based on a signal value in the training image and a threshold of the signal value, and ground truth data, and making a neural network learn for executing a recognition task or a regression task using input data including the training image and the first map, and the ground truth data.

An image processing apparatus configured to perform the above image processing method also constitute another aspect of the present invention.

Further features of the present invention will become apparent from the following description of exemplary embodiments with reference to the attached drawings.

DESCRIPTION OF THE EMBODIMENTS

Figure 1:
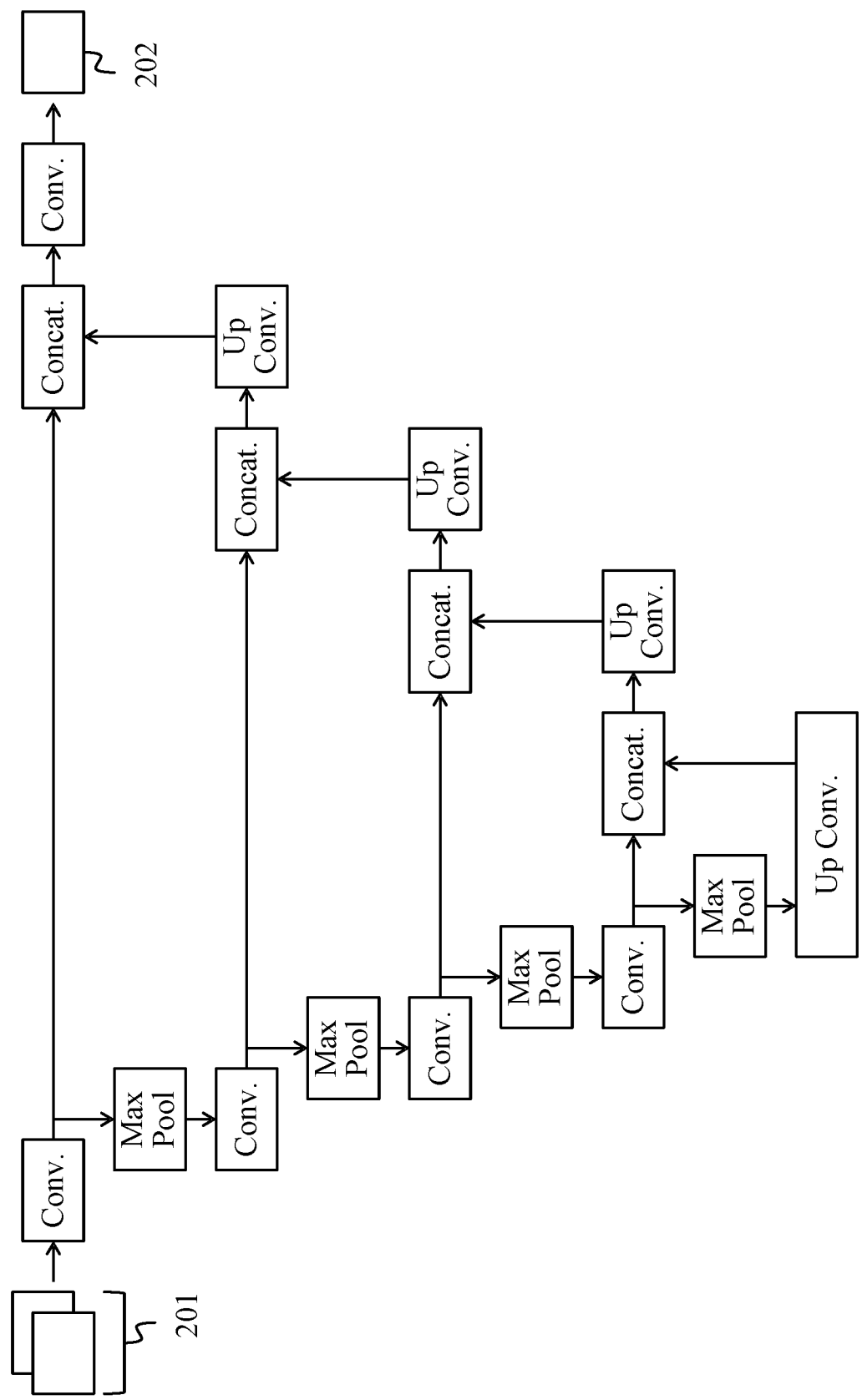
FIG. 1 is a diagram illustrating a configuration of a neural network according to a first embodiment.

Referring now to the accompanying drawings, a detailed description will be given of embodiments according to the present invention. Corresponding elements in respective figures will be designated by the same reference numerals, and a duplicate description thereof will be omitted.

At first, before a specific description for the embodiments, the gist of the present invention will be given. The present invention suppresses a decrease in estimation accuracy caused by luminance saturation or a blocked-up shadow in an image during a recognition or regression task using a neural network. Here, input data input to the neural network is x (d-dimensional vector, d is a natural number). The recognition is a task for finding a class y corresponding to the vector x. For example, there is a task for recognizing a characteristic and significance of an object, such as a task for classifying objects in an image into a person, a dog, or a car, and a task for recognizing an expression such as a smiling face and a crying face from a face image. The class y is generally a discrete variable, and may be a vector in generation of a segmentation map or the like. The regression, on the other hand, is a task for finding a continuous variable y corresponding to the vector x. For example, there are a task for estimating a noise-free image from a noise image, and a task for estimating a high-resolution image before downsampling from a downsampled image.

As described above, an area having the luminance saturation or blocked-up shadow (referred to as a luminance saturated area or a blocked-up shadow area hereinafter) has lost information on a configuration in an object space, and a false edge may appear at a boundary between each area. Thus, it is difficult to correctly extract a feature value of the object. As a result, the estimation accuracy of the neural network decreases. In order to suppress the decrease, the present invention uses an input image and a map outside a dynamic range corresponding to the input image as input data for the neural network. The map outside the dynamic range (first map) is a map representing a luminance saturated area or a blocked-up shadow area in an input image. Using the input map outside the dynamic range, the neural network can specify a problematic area as described above so as to suppress the decrease in the estimation accuracy.

In a following description, a step for learning a weight of a neural network will be referred to as a learning phase, and a step for performing the recognition or regression using the learnt weight will be referred to as an estimating phase.

First Embodiment

A description will now be given for an image processing system according to a first embodiment of the present invention. In the first embodiment, a neural network executes a recognition task (segmentation whether a person or not) for detecting a person area in an image. However, the present invention is not limited to this embodiment, and is similarly applicable to other recognition and regression tasks.

Figure 2:
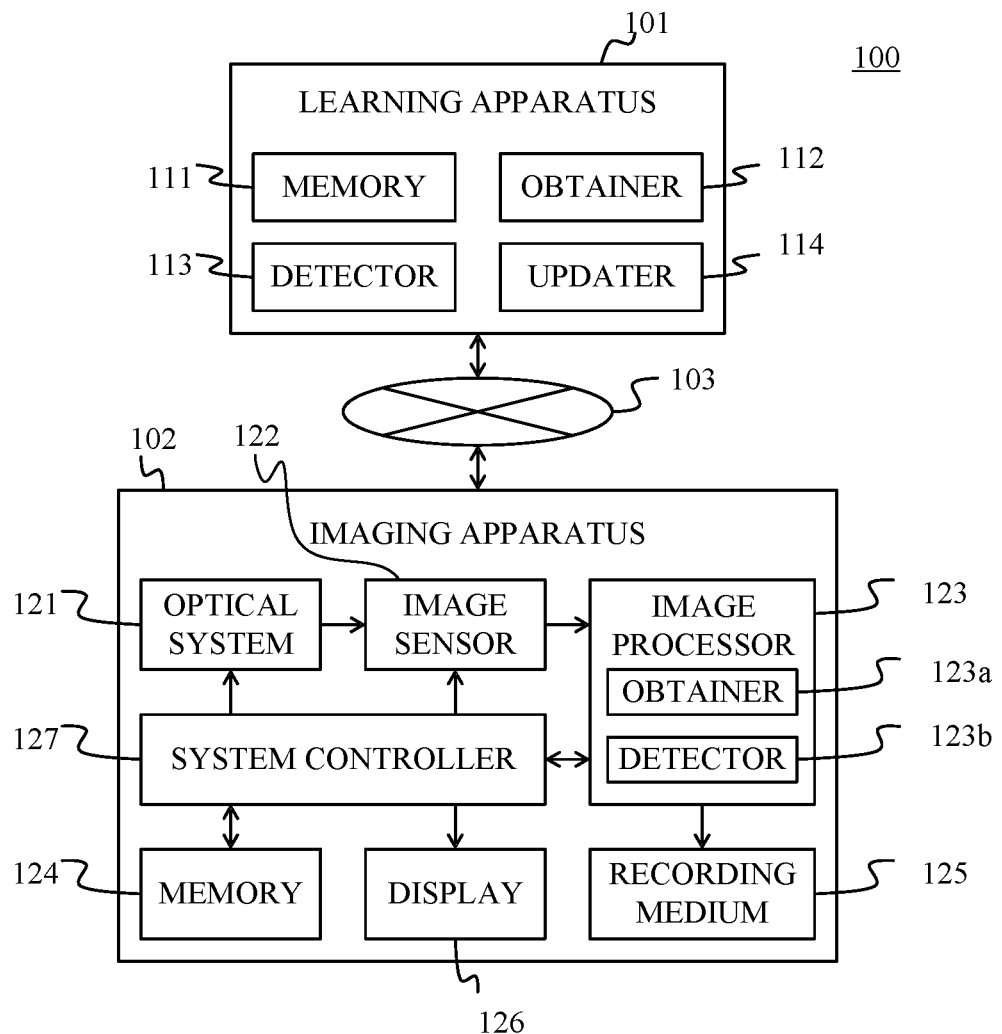
FIG. 2 is a block diagram of an image processing system according to the first embodiment.
Figure 3:
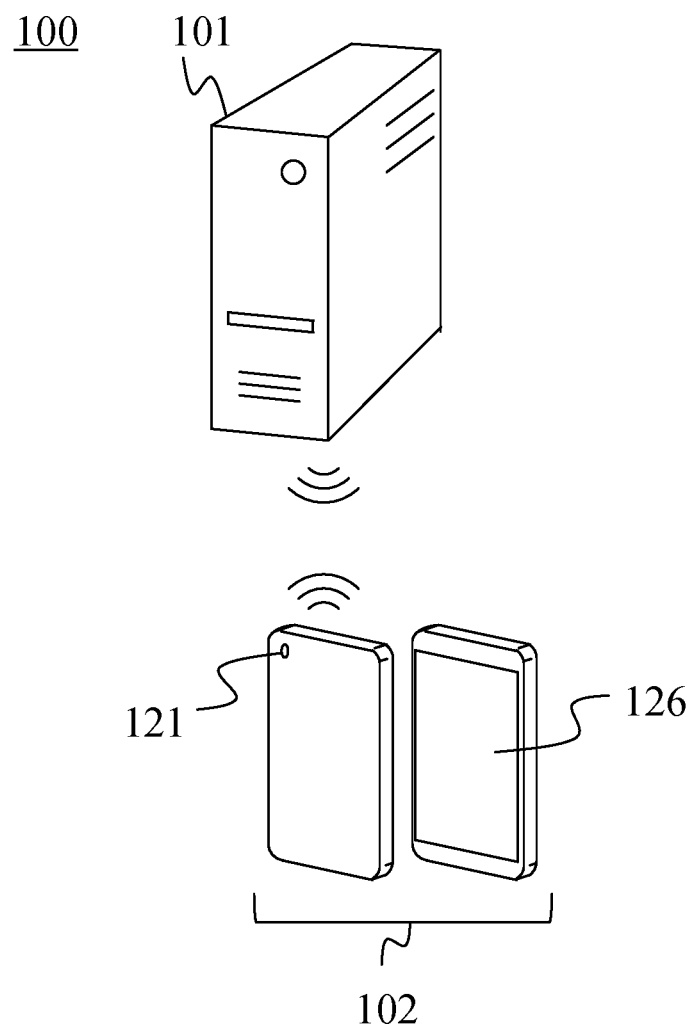
FIG. 3 is an external view of the image processing system according to the first embodiment.

FIG. 2 is a block diagram illustrating an image processing system 100 in this embodiment. FIG. 3 is an external view of the image processing system 100. FIG. 3 illustrates both a front side and a back side of an imaging apparatus (image processing apparatus) 102. The image processing system 100 includes a learning apparatus (image processing apparatus) 101, the imaging apparatus 102, and a network 103. The learning apparatus 101 includes a memory 111, an obtainer (obtaining unit) 112, a detector (learning unit) 113, and an updater (learning unit) 114, and is configured to learn a weight of the neural network for detecting a person area. The details of this learning will be described later. The memory 111 stores weight information learned by the learning apparatus 101. The imaging apparatus 102 executes an acquisition for a captured image and a detection for the person area using the neural network.

The imaging apparatus 102 includes an optical system 121 and an image sensor 122. The optical system 121 collects a light entering the imaging apparatus 102 from an object space. The image sensor 122 receives (photoelectrically converts) an optical image (object image) formed via the optical system 121 and obtains a captured image. The image sensor 122 is, for example, a CCD (Charge Coupled Device) sensor or a CMOS (Complementary Metal-Oxide Semiconductor) sensor.

An image processor 123 includes an obtainer (obtaining unit) 123a and a detector (processing unit) 123b, and is configured to detect the person area using at least part of the captured image as an input image using weight information stored in a memory 124. The weight information is read in advance from the learning apparatus 101 via a wired or wireless network 103 and stored on the memory 124. The stored weight information may be a weight value itself or an encoded format. A detailed description will be given later regarding detecting processing for the person area. The image processor 123 executes processing based on the detected person area, and generates an output image. For example, the image processor 123 adjusts brightness in the captured image so that the person area has suitable brightness. A recording medium 125 stores the output image. Alternatively, the captured image may be stored on the recording medium 125 as it is, and thereafter the image processor 123 may read the captured image from the recording medium 125 and detect the person area. A display 126 displays the output image stored in the recording medium 125 according to a user's instruction. A system controller 127 controls the series of operation.

Figure 4:
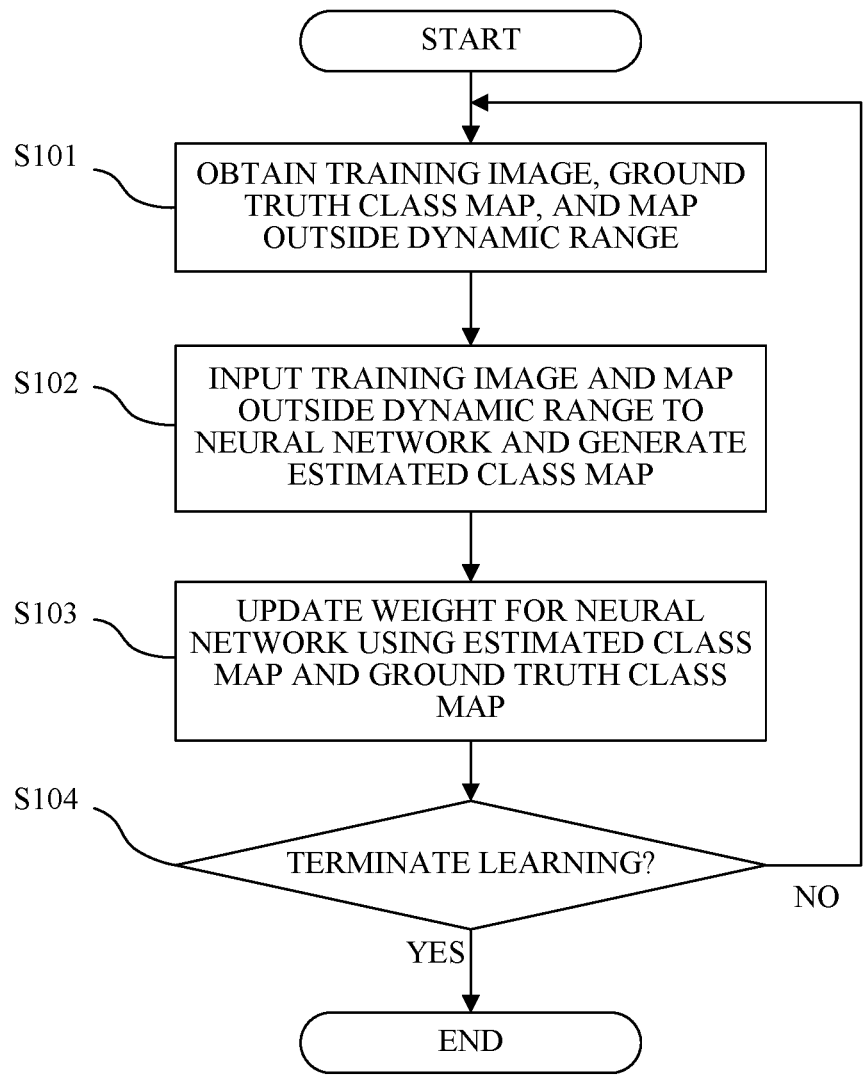
FIG. 4 is a flowchart relating to weight learning according to the first embodiment.

Referring now to FIG. 4, a description will be given of weight learning (manufacturing a learnt model) executed by the learning apparatus 101 in this embodiment. FIG. 4 is a flowchart relating to the weight learning. Mainly, the obtainer 112, the detector 113, or the updater 114 in the learning apparatus 101 executes each step in FIG. 4.

First in the step S101, the obtainer 112 obtains one or more sets of a training image and a ground truth class map (also referred to as a ground truth segmentation map or ground truth data), and a map outside a dynamic range. The training image is an input image during a learning phase of the neural network. The ground truth class map is a ground truth segmentation map corresponding to the training image.

Figure 5A:
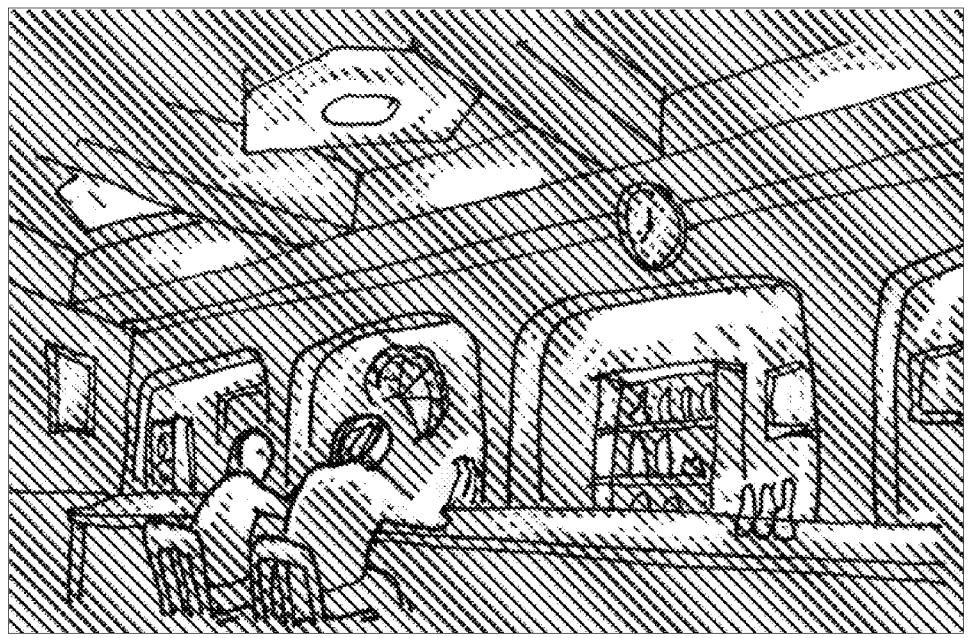
FIGS. 5A and 5B are diagrams illustrating an example of a training image and a ground truth class map according to the first embodiment.
Figure 5B:
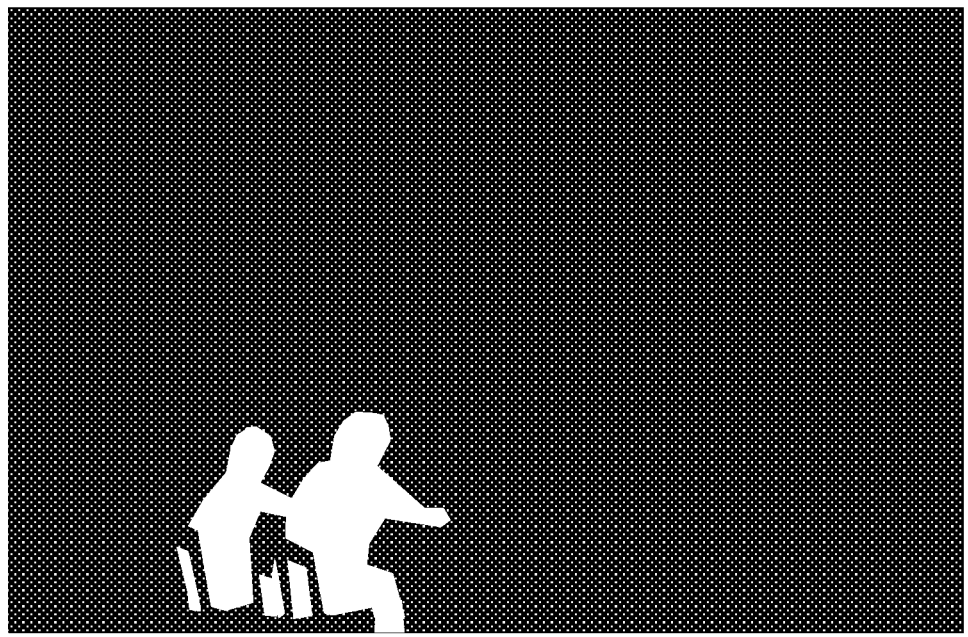
Figure 6A:
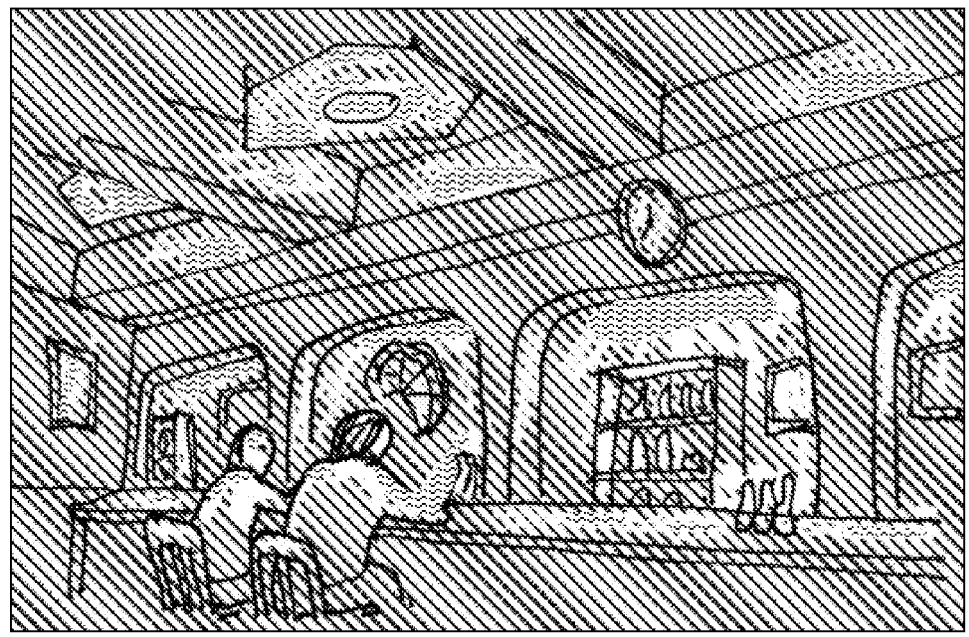
FIGS. 6A and 6B are diagrams illustrating an example of a luminance saturated area of a training image and a map outside a dynamic range according to the first embodiment.
Figure 6B:
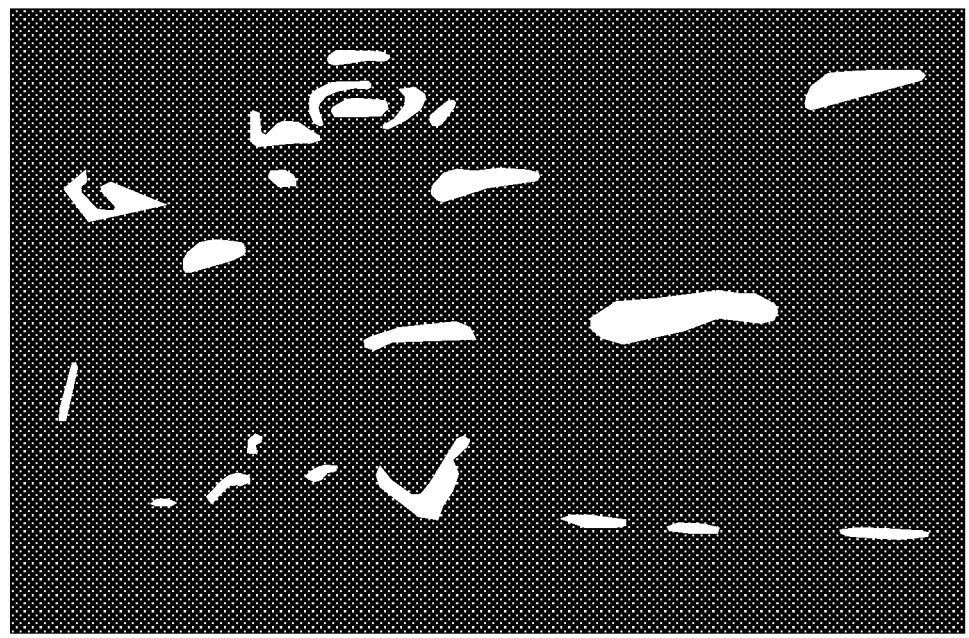

FIGS. 5A and 5B illustrate examples for a training image and a ground truth class map. FIGS. 6A and 6B are diagrams illustrating examples for a luminance saturated area and the map outside the dynamic range of the training image. FIG. 5A illustrates the example of thee training image, and FIG. 5B illustrates the corresponding ground truth class map. A white area in FIG. 5B is a class representing a person area, and a black area is a class representing the other area. The training image in FIG. 5A has an area having luminance saturation.

FIG. 6A illustrates an image in which wavy lines represent the luminance saturated area. In this embodiment, the map outside the dynamic range (first map) is a map indicating whether the luminance saturation has occurred for each pixel in a training image. However, the present invention is not limited to this embodiment, and the map may be a map representing a blocked-up shadow. A signal value at each pixel in the training image is compared with a luminance saturation value that is a threshold. When the signal value is equal to or larger than the luminance saturation value, the map outside the dynamic range is generated where the map indicates that the signal value is outside the dynamic range. Alternatively, the map outside the dynamic range may be generated in advance according to the above described method for the training image and may be obtained by reading out.

In this embodiment, the map outside the dynamic range is a binary map of 1 or 0 (information indicating whether the luminance saturation occurs) as illustrated in FIG. 6B. The numerical significance may be reversed. The binary map has an advantage of reducing data capacity. However, the present invention is not limited to this embodiment. The map outside the dynamic range may be a map having an intermediate value so as to indicate how close the signal value is to the luminance saturation value. The learning phase uses a plurality of training images of various imaging scenes so that an estimating phase stably detects a person area even in an image of an unknown imaging scene. The plurality of training images may be obtained by changing brightness in the same imaging scene. The training image has a same format as an input image in the estimating phase. If the input image in the estimating phase is an undeveloped RAW image, the training image is also an undeveloped RAW image. If the input image in the estimating phase is an image after the development, the same applies to the training image. When the training image is a RAW image, the map outside the dynamic range may be generated after a white balance is applied. The input image and the training image in the estimating phase may not necessarily have a same pixel number.

Next in the step S102 of FIG. 4, the detector 113 inputs the training image and the map outside the dynamic range to the neural network, and generates an estimated class map. In this embodiment, the neural network uses a U-Net (for detailed description, refer to O. Ronneberger, P. Fischer, and T. Brox, "U-net: Convolutional networks for biomedical image segmentation," in MICCAI, 2015) illustrated in FIG. 1, but the present invention is not limited to this embodiment. Input data 201 is data obtained by concatenating the training image with the map outside the dynamic range in a channel direction. The order of the concatenation is not limited, and the other data may be interposed between them. The training image may have a plurality of channels of RGB (Red, Green, Blue). The map outside the dynamic range may have only one channel or the same number of channels as the training image. When having one channel, the map outside the dynamic range is a map, for example, expressing a presence or absence of the luminance saturation for the luminance component excluding a color difference. The pixel number (number of elements) per one channel is the same between the training image and the map outside the dynamic range. Even though the training images of various scenes including the luminance saturation are input to the neural network, by including the map outside the dynamic range in the input data, the neural network can identify the luminance saturated area in the training image, and can suppress a decrease in estimation accuracy.

The input data may be normalized if necessary. When the training image is a RAW image, a black level may be different depending on an image sensor or an ISO speed. Thus, after the black level is subtracted from the signal value in the training image, the training image is input to the neural network. The normalization may be performed after the black level is subtracted. Conv. in FIG. 1 represents one or more convolutional layers, Max Pool represents maximum value pooling, Up Conv. represents one or more convolutional layers including upsampling, and Concat. represents the concatenation in the channel direction. At the first time of learning, a random number is used to determine a weight for a filter in each convolutional layer. An estimated class map 202 which is an output from the U-Net corresponding to the training image is calculated.

Only one of the input image and the map outside the dynamic range may be input to the first layer in the neural network, and a feature map that is an output from at least the first layer may be concatenated with the other that has not been input to the first layer in the channel direction and may be input to subsequent layer. Alternatively, input part of the neural network may be branched, the input image and the map outside the dynamic range may be converted into feature maps in different layers, and the feature maps may be concatenated with each other and may be input to the subsequent layer.

Subsequently in the step S103 in FIG. 4, the updater 114 updates the weight of the neural network based on the estimated class map and the ground truth class map. The first embodiment uses cross entropy of the estimated class map and the ground truth class map as a loss function, but the present invention is not limited to this embodiment. The weight is updated from a calculated value of the loss function by a backpropagation or the like.

Subsequently in the step S104 of FIG. 4, the updater 114 determines whether weight learning has been completed. The completion can be determined based on whether the number of iterations of learning (weight updating) has reached a predetermined value, or whether a weight variation amount at the time of updating is smaller than a predetermined value. If the weight learning is determined to be not completed, the process returns to the step S101 to newly obtain one or more sets of a training image, a map outside a dynamic range, and a ground truth class map. On the other hand, if the weight learning is determined to be completed, the learning is terminated, and the memory 111 stores the weight information.

Figure 7:
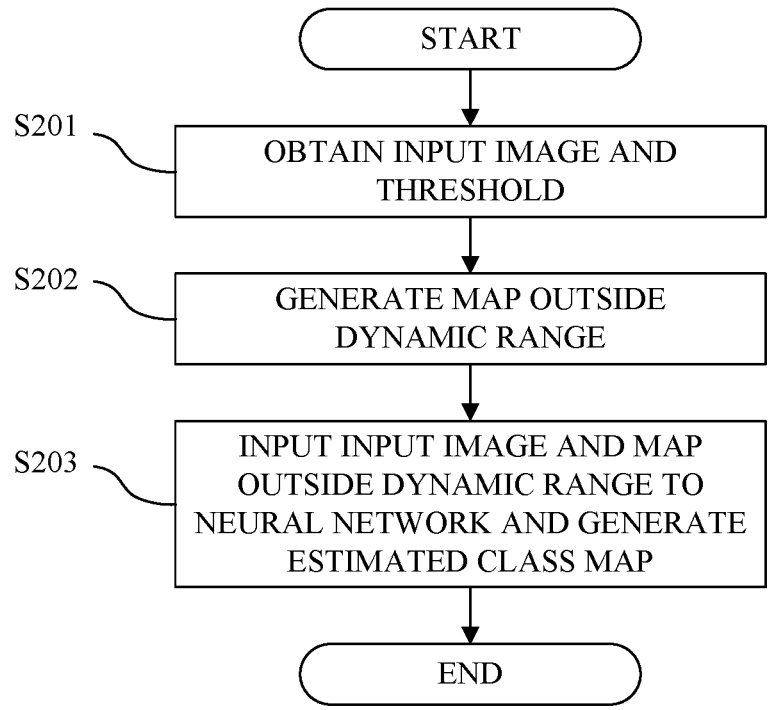
FIG. 7 is a flowchart relating to generation of an estimated class map according to the first embodiment.

Referring now to FIG. 7, a description will be given of the person area detection (generation of an estimated class map, estimating phase) in an input image executed by the image processor 123 in this embodiment. FIG. 7 is a flowchart relating to the generation of the estimated class map. Mainly, the obtainer 123a or the detector 123b in the image processor 123 executes each step in FIG. 7.

First in the step S201, the obtainer 123a obtains an input image and a threshold corresponding to the input image (luminance saturation value in this embodiment). The input image is at least part of a captured image captured by the image sensor 122. The memory 124 has stored the luminance saturation value of the image sensor 122, and the value is read and obtained. Subsequently in the step S202, the obtainer 123a generates a map outside a dynamic range based on a comparison between a signal value and the threshold at each pixel in the input image. Subsequently in the step S203, the detector 123b inputs the input image and the map outside the dynamic range as input data to a neural network, and generates an estimated class map. At this time, the weight obtained in the neural network and learning phase in FIG. 1 is used.

This embodiment can provide an image processing system that can generate a highly accurate segmentation map even when the luminance saturation occurs.

Second Embodiment

A description will now be given of an image processing system in a second embodiment of the present invention. In this embodiment, a neural network is configured to execute a regression task for deblurring a captured image having a blur caused by an aberration and a diffraction. However, the present invention is not limited to this embodiment, and is applicable to another recognition or regression task.

Figure 8:
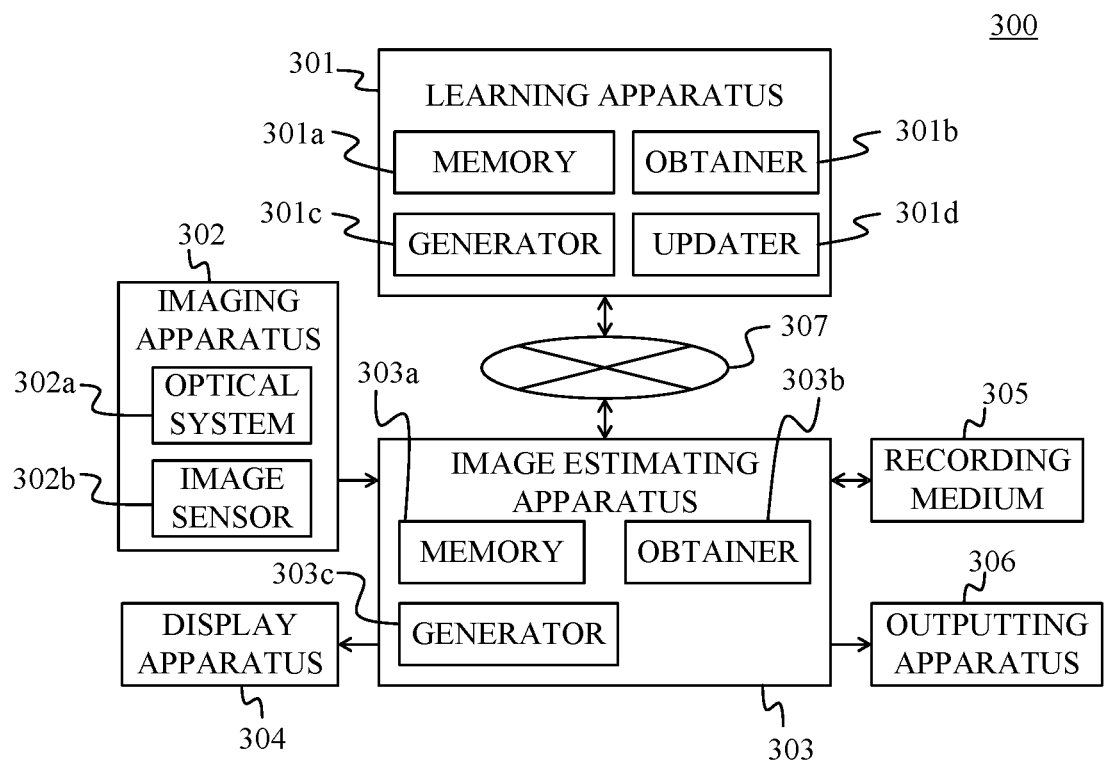
FIG. 8 is a block diagram of an image processing system according to a second embodiment.
Figure 9:
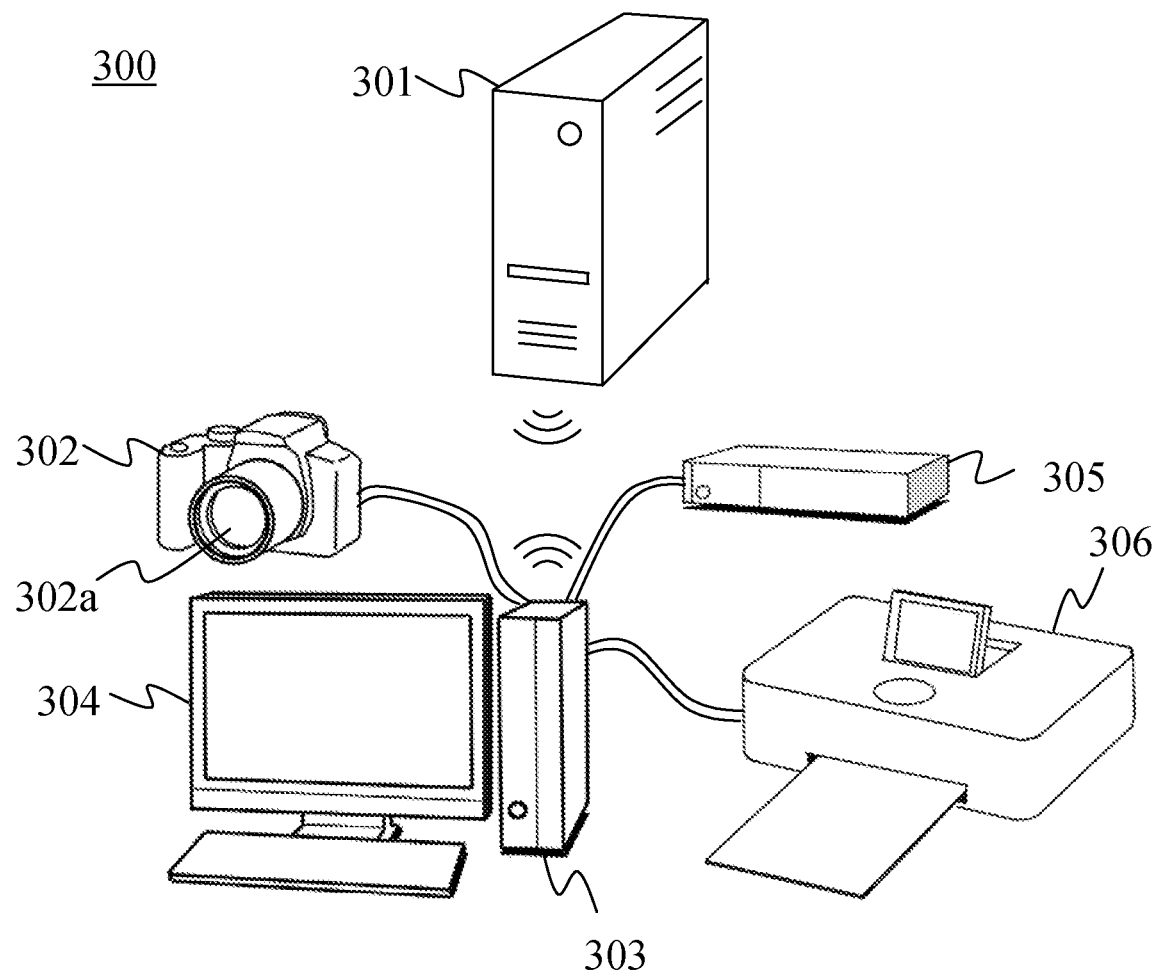
FIG. 9 is an external view of the image processing system according to the second embodiment.

FIG. 8 is a block diagram of an image processing system 300 in this embodiment. FIG. 9 is an external view of the image processing system 300. The image processing system 300 includes a learning apparatus (image processing apparatus) 301, an imaging apparatus 302, an image estimating apparatus (image processing apparatus) 303, a display apparatus 304, a recording medium 305, an outputting apparatus 306, and a network 307.

The learning apparatus 301 includes a memory 301a, an obtainer (obtaining unit) 301b, a generator (learning unit) 301c, and an updater (learning unit) 301d. The imaging apparatus 302 includes an optical system 302a and an image sensor 302b. A captured image captured by the image sensor 302b includes blurs caused by an aberration and a diffraction of the optical system 302a, and the luminance saturation and blocked-up shadow due to the dynamic range of the image sensor 302b. The image estimating apparatus 303 includes a memory 303a, an obtainer 303b, and a generator 303c, and is configured to generate an estimated image obtained by deblurring an input image that is at least part of the captured image, and to generate a weighted average image from the input image and the estimated image. The input image and the estimated image are RAW images. A neural network is used for deblurring, and its weight information is read from the memory 303a. The learning apparatus 301 has learned the weight, and the image estimating apparatus 303 has read out the weight information from the memory 301a via the network 307 in advance and the memory 303a has stored the weight information. A detailed description will be given later of the weight learning and deblurring processing using the weight. The image estimating apparatus 303 performs developing processing on the weighted average image, and generates an output image. The output image is output to at least one of the display apparatus 304, the recording medium 305, and the outputting apparatus 306. The display apparatus 304 is, for example, a liquid crystal display or a projector. Via the display apparatus 304, a user can perform editing work or the like while checking an image under processing. The recording medium 305 is, for example, a semiconductor memory, a hard disk drive, or a server on a network. The outputting apparatus 306 is a printer or the like.

Figure 10:
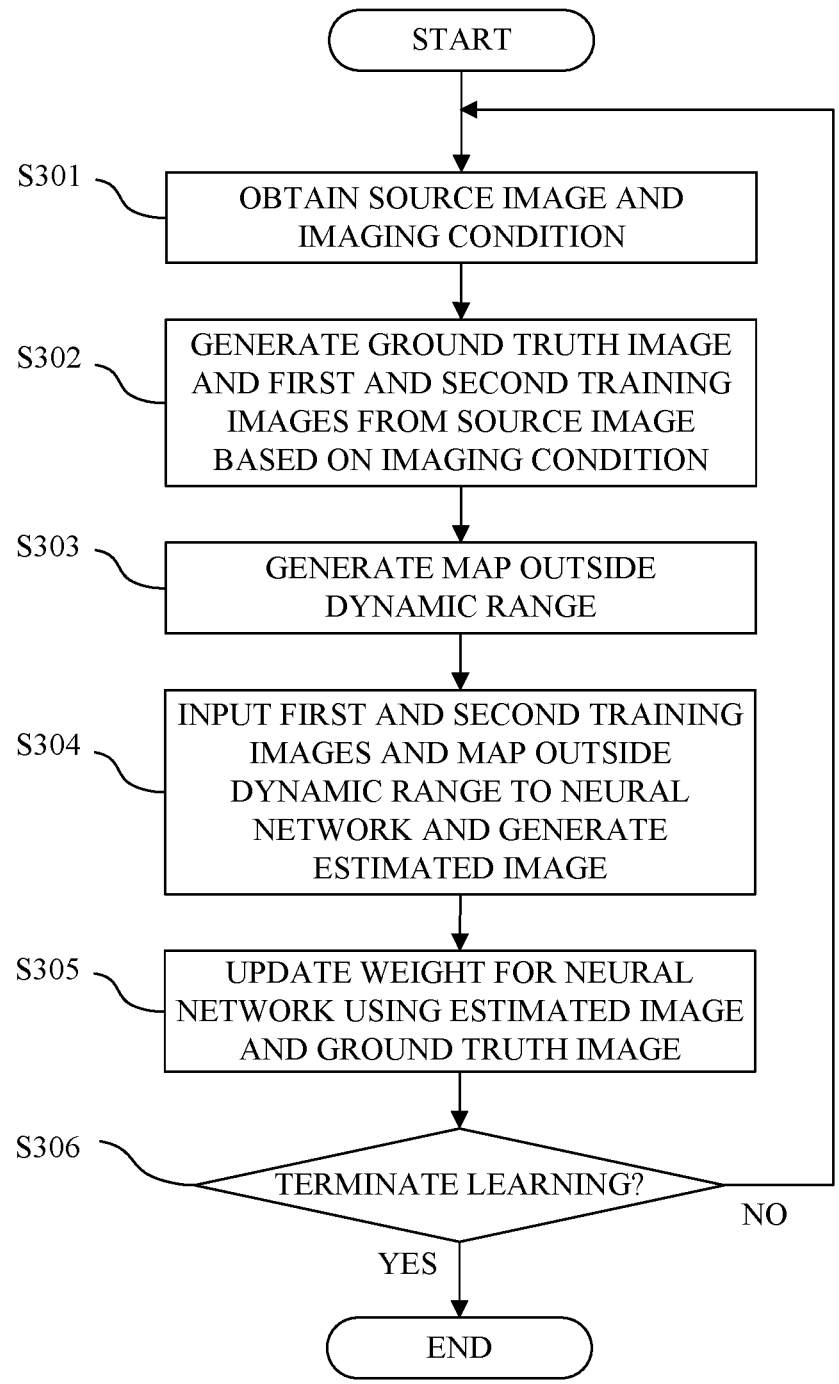
FIG. 10 is a flowchart relating to weight learning according to the second embodiment.

Referring now to FIG. 10, a description will be given of weight learning (learning phase) executed by the learning apparatus 301. FIG. 10 is a flowchart relating to the weight learning. Mainly, the obtainer 301b, the generator 301c, or the updater 301d in the learning apparatus 301 executes each step in FIG. 10.

First in the step S301, the obtainer 301b obtains one or more sets of a source image and an imaging condition. A pair of a blurred image (referred to as a first training image hereinafter) and a non-blurred image (referred to as a ground truth image hereinafter) is required for the deblurring learning for the aberration and the diffraction. This embodiment generates the pair from the source image through an imaging simulation. However, the present invention is not limited to this embodiment, and the pair may be prepared by imaging the same object using a lens likely to cause a blur due to the aberration and the diffraction and a higher performance lens.

This embodiment learns and deblurs using a RAW image. However, the present invention is not limited to this embodiment, and may use an image after development. The source image is a RAW image, and the imaging condition is a parameter for the imaging simulation that uses the source image as an object. The parameter includes an optical system used for imaging, a state of the optical system (zoom, aperture stop, and in-focus distance), an image height, a presence or absence and a type of an optical low-pass filter, a noise characteristic of the image sensor, a pixel pitch, an ISO speed, a color filter array, a dynamic range, a black level, and the like. This embodiment learns a weight to be used in the deblurring for each optical system. This embodiment sets a plurality of combinations of the state, the image height, the pixel pitch, the ISO speed, and the like for a specific optical system, and generates a pair of a first training image and a ground truth image (ground truth data) under different imaging conditions. The source image may be an image with a wider dynamic range than that of the training image. When the dynamic ranges are the same between the source image and the training image, blurring processing deletes a small luminance saturated area or a small blocked-up shadow area in the source image, making it difficult to perform learning. The source image with a wide dynamic range can be prepared by capturing an image using an image sensor having a wide dynamic range, or by capturing and combining images of the same object in different exposure conditions.

Subsequently in the step S302, the generator 301c generates a first training image, a second training image, and a ground truth image from the source image based on the imaging condition. The first training image and the ground truth image are an image obtained by adding a blur caused by the aberration and the diffraction of the optical system to the source image, and an image that is the source image with no blur added, respectively. Noises may be added to the first training image and the ground truth image if necessary. When no noise is added to the first training image, the neural network amplifies noises as well as deblurring in the estimating phase. The neural network learns the deblurring and denoising when the noise is added to the first training image and no noise is added to the ground truth image, or the noise having no correlation with the noise in the first training image is added to the ground truth image. On the other hand, the neural network learns deblurring in which a noise variation is suppressed when the noise having a correlation with the noise in the first training image is added to the ground truth image.

This embodiment adds correlating noises to the first training image and the ground truth image. If the dynamic range in the source image is larger than that of the first training image, the signal value is clipped so as to bring the dynamic range in the first training image and the ground truth image into the original ground truth range. This embodiment uses a Wiener filter for the first training image, and generates the second training image in which the blur has been corrected to some extent (referred to as an intermediate deblurred image in the learning phase hereinafter). The Wiener filter is a filter calculated from the blur given to the first training image. However, a correcting method is not limited to the Wiener filter, and another inverse filter-based method or a Richardson-Lucy method may be used. By using the second training image, it is possible to improve the robustness in the deblurring for a blur variation in the neural network. The source image may be reduced during the imaging simulation if necessary. When the source image is prepared not by CG (Computer Graphics) but by actual imaging, the source image is an image captured through a certain optical system. Thus, the source image has already included blurs caused by the aberration and the diffraction. However, the reduction can reduce the influence of the blurs and generate the ground truth image including a high frequency.

Subsequently in the step S303, the generator 301c generates a map outside a dynamic range based on a comparison between a signal value in the first training image (input image in the learning phase) and a threshold of the signal value. However, the map outside the dynamic range may be generated from the signal value in the second training image.

Figure 11A:
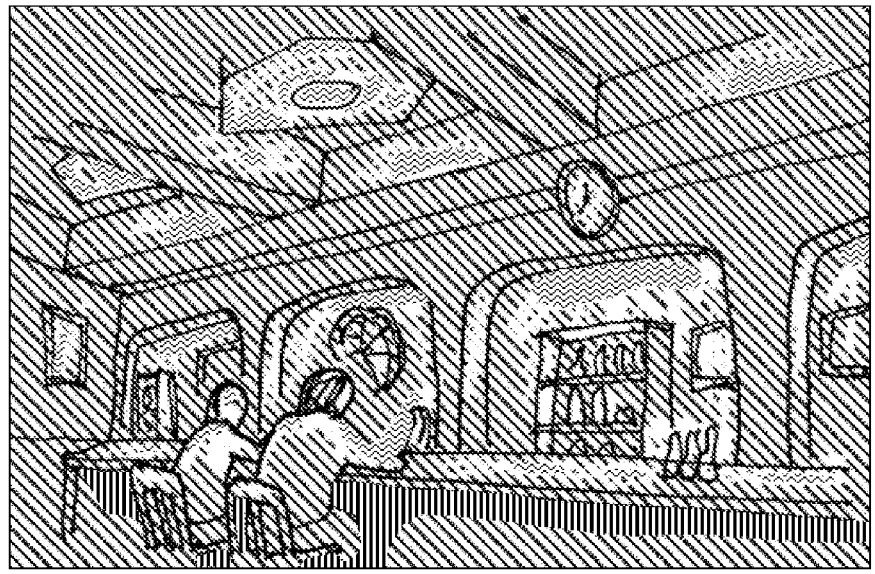
FIGS. 11A and 11B are diagrams illustrating an example of a luminance saturated area and a blocked-up shadow area in a training image and a map outside a dynamic range according to the second embodiment.
Figure 11B:

In this embodiment, the signal threshold is based on a luminance saturation value and a black level of the image sensor 302b. Examples are illustrated in FIGS. 11A and 11B. FIG. 11A is the first training image, in which a wavy line represents an area having a signal value equal to or larger than the luminance saturation value (referred to as a first threshold hereinafter). A vertical line represents an area having a signal value equal to or less than a value obtained by adding a constant to the black level (referred to as a second threshold hereinafter). At this time, the map outside the dynamic range corresponding to the first training image is as illustrated in FIG. 11B. The area having the signal value equal to or larger than the first threshold is set to 1, the area having the signal value equal to or less than the second threshold is set to 0, and the other area is set to 0.5. However, the present invention is not limited to this embodiment. For example, an area having a signal value larger than the second threshold and less than the first threshold may be set to 0, and the other area having a configuration with luminance saturation or a blocked-up shadow may be set to 1.

Next follows the reason why the constant is added to the black level in the second threshold. Since the noise is added to the first training image, even if a true signal value is the black level, the signal value may exceed the black level due to the noise. Thus, the constant is added to the second threshold in consideration of an increase in the signal value due to the noise. The constant may be a value reflecting a noise amount. For example, the constant may be set to n times a standard deviation of the noise (n is a positive real number). The map outside the dynamic range is input to the neural network both in the learning phase and the estimating phase. Because the learning phase adds the noise during the simulation, the standard deviation of the noise in the input image is known, but in the estimating phase, the standard deviation of the noise in the input image is unknown. Hence, the estimating phase may measure the noise characteristic of the image sensor 302b in advance, and may determine the constant to be added to the second threshold from the ISO speed at the time of the imaging. If the noise is small enough, the constant may be zero.

Figures 12A, 12B:
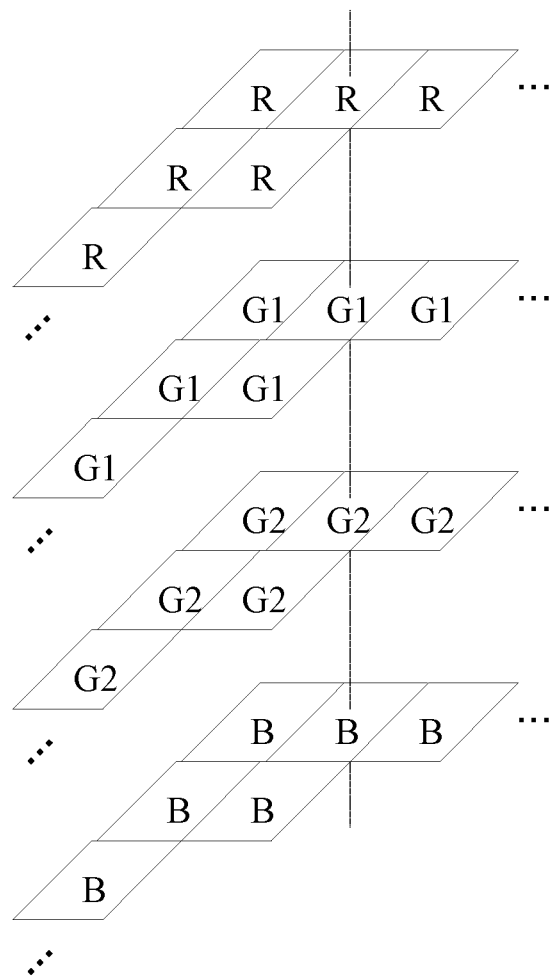
FIGS. 12A and 12B are diagrams illustrating a four-channel conversion on the training image according to the second embodiment.

Subsequently in the step S304, the generator 301c inputs the first and the second training images and the map outside the dynamic range to the neural network, and generates an estimated image (that is, a deblurred image). This embodiment converts the first and the second training images and the map outside the dynamic range into a four-channel format, respectively, and inputs them to the neural network. FIGS. 12A and 12B will describe this conversion. FIG. 12A illustrates a color filter array in the first training image. G1 and G2 represent two green components. During inputting to the neural network, the first training image is converted into the four-channel format as illustrated in FIG. 12B. Broken lines represent each channel component at the same position. However, a color order in the array is not limited to that illustrated in FIGS. 12A and 12B. Similarly, the second training image and the map outside the dynamic range are converted into the four-channel format. It is not always necessary to perform the conversion into the four-channel format. The first and second training images may be normalized and the black level may be subtracted if necessary.

Figure 13:
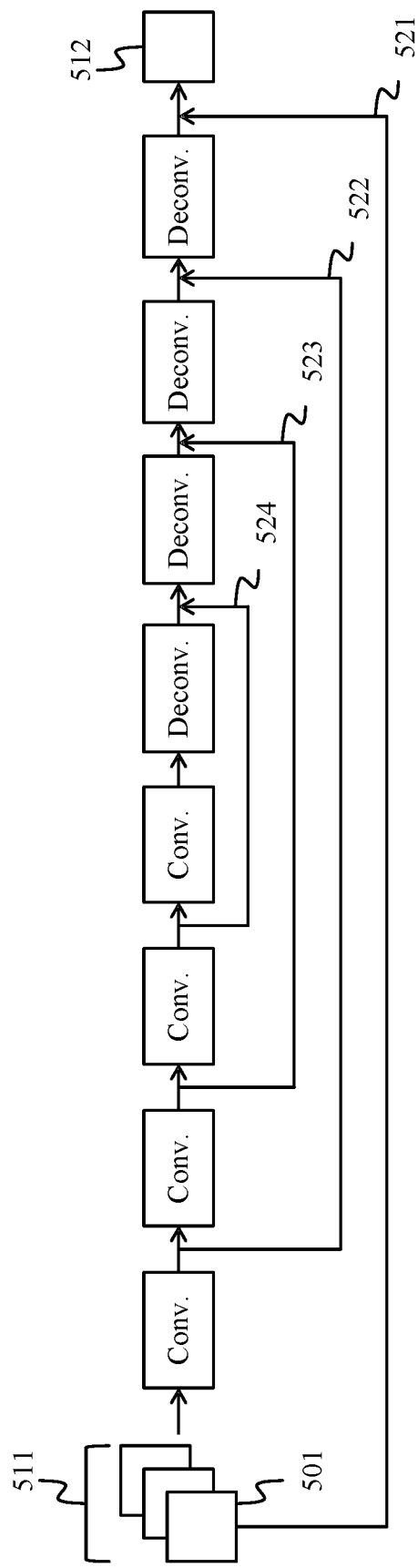
FIG. 13 is a diagram illustrating a configuration of a neural network according to the second embodiment.

This embodiment uses a neural network illustrated in FIG. 13, but the present invention is not limited to this embodiment, and may use, for example, a GAN (Generative Adversary Network). An input data 511 is data obtained by concatenating a first training image 501, a second training image, and the map outside the dynamic range, which are converted into the four-channel format, in the channel direction. There is no restriction on the concatenating order in the channel direction. Conv. represents one or more convolutional layers, and Decov. represents one or more deconvolution layers. The second to fourth skip connections 522 to 524 take the sum of each element in the two feature maps, or may concatenate the elements in the channel direction. A first skip connection 521 obtains an estimated image 512 by taking the sum of the first training image 501 (or the second training image) and a residual image output from the final layer. However, the number of the skip connections is not limited to that in FIG. 13. The estimated image 512 is also a four-channel image as illustrated in FIG. 12B.

In the image resolution enhancement and contrast enhancement, such as deblurring, a problem may occur near an area with object information lost due to the luminance saturation or the blocked-up shadow. In addition, the deblurring may reduce the area with the object information lost. The neural network needs to perform inpainting processing in the area with the object information lost, unlike in the other areas. Using the input map outside the dynamic range being input, the neural network can specify these areas, and can perform highly accurate deblurring.

Subsequently in the step S305, the updater 301d updates the weight of the neural network from the estimated image and the ground truth image. This embodiment defines, as a loss function, a Euclidean norm of the difference in the signal values between the estimated image and the ground truth image. However, the loss function is not limited to this. Before the difference is taken, the ground truth image is also converted into the four-channel format in accordance with the estimated image. The second embodiment removes, from the loss, an area having the luminance saturation or the blocked-up shadow. Since the area has lost the information on the object space, an inpainting task is required as described above in order to make the estimated image similar to the ground truth image. Since inpainting may cause a false configuration, the second embodiment excludes the area from the estimation, and replaces the area with the input image also in the estimating phase. The first training image includes a plurality of color components as illustrated in FIG. 12B. Thereby, even if a certain color component has the luminance saturation or the blocked-up shadow, the configuration of the object may be obtained by the other color component. In this case, since information on the area having the luminance saturation or the blocked-up shadow can be estimated from a pixel existing at an extremely close position, a false configuration hardly appears. Thus, in the map outside the dynamic range, a loss weight map is generated where all the pixels with the channels outside the dynamic range are set to 0, the other pixels are set to 1, and the loss is calculated by taking a product of each component regarding a difference between the estimated image and the ground truth image. Thereby, it is possible to exclude only an area likely to have the false configuration. It is not always necessary to exclude the area likely to have the false configuration from the loss.

Subsequently in the step S306, the updater 301d determines whether the learning has been completed. If the learning is not completed, the process returns to the step S301 to newly obtain one or more sets of a source image and an imaging condition. On the other hand, if the learning is completed, the memory 301a stores the weight information.

Figure 14:
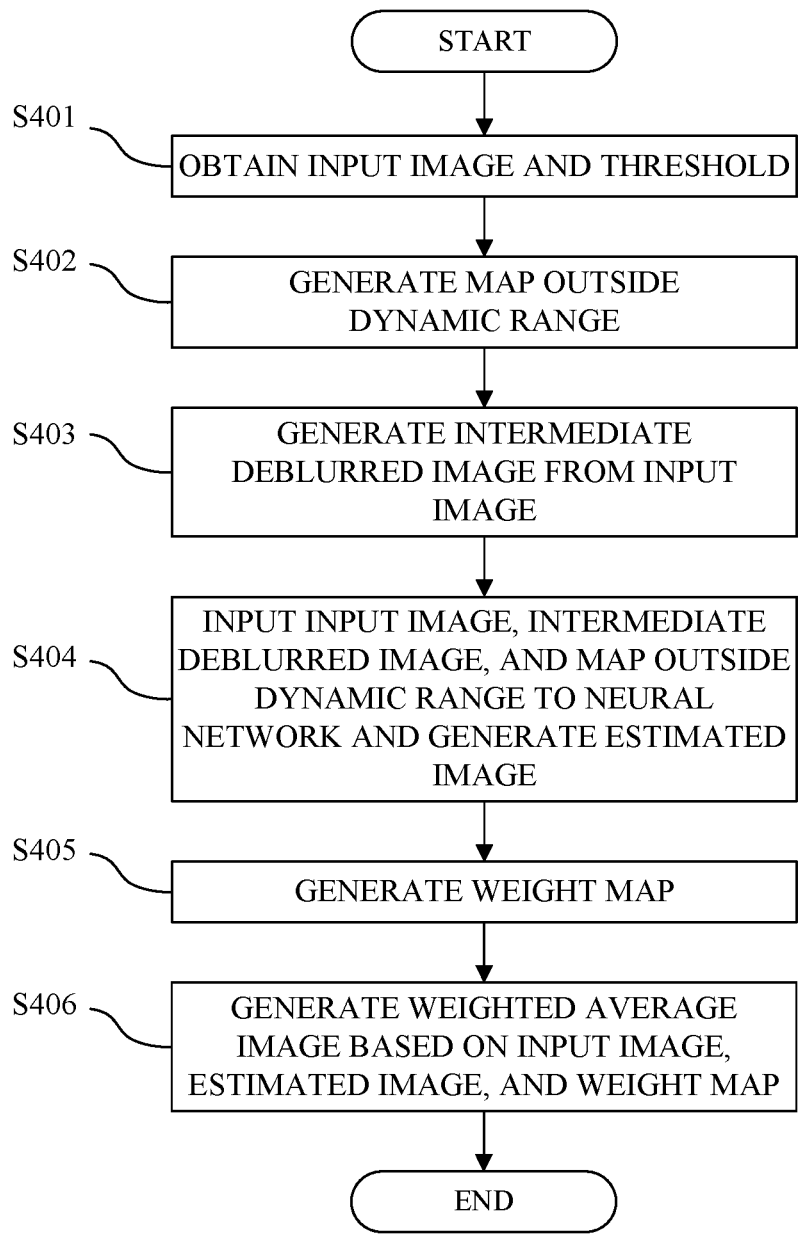
FIG. 14 is a flowchart relating to generation of a weighted average image according to the second embodiment.

Referring now to FIG. 14, a description will be given of deblurring for the aberration and the diffraction in an input image executed by the image estimating apparatus 303 (generation of a weighted average image, estimating phase). FIG. 14 is a flowchart relating to the generation of the weighted average image. Mainly, the obtainer 303b and the generator 303c in the image estimating apparatus 303 execute each step in FIG. 14.

First in the step S401, the obtainer 303b obtains an input image and thresholds corresponding to the input image from a captured image. A first threshold is a luminance saturation value of the image sensor 302b, and a second threshold is a value obtained by adding a constant to a black level of the image sensor 302b. The constant is determined from an ISO speed in capturing the captured image using a noise characteristic of the image sensor 302b.

Subsequently in the step S402, the generator 303c generates a map outside a dynamic range from a comparison of a signal value of the input image and the first and second thresholds. The map outside the dynamic range is generated by a method similar to that in the step S303 in the learning phase.

Subsequently in the step S403, the generator 303c generates an intermediate deblurred image from the input image. The generator 303c generates the intermediate deblurred image by reading out information on a Wiener filter that corrects a blur caused by the aberration and the diffraction of the optical system 302a from the memory 303a and by applying the information to the input image. Since the input image has a different blur for each image height, a shift variant correction is performed. Whichever the step S402 or the step S403 may be performed first.

Subsequently in the step S404, the generator 303c inputs the input image, the intermediate deblurred image, and the map outside the dynamic range to a neural network, and generates an estimated image. The neural network uses the configuration illustrated in FIG. 13 and inputs input data obtained by concatenating the input image (corresponding to the first training image), the intermediate deblurred image (corresponds to the second training image), and the map outside the dynamic range in the channel direction with the same order as that in the learning. The estimated image is generated by reading out weight information corresponding to the optical system 302a from the memory 303a. If the step S404 has performed the normalization or black level subtraction in inputting to the neural network, processing for restoring a scale of a signal value and for adding the black level is performed for the estimated image.

Subsequently in the step S405, the generator 303c calculates a weight map based on a comparison between the signal value in the input image and the first and second thresholds. That is, the generator 303c obtains a weight map based on the signal value in the input image and the thresholds of the signal value. This embodiment calculates the weight map using the map outside the dynamic range, similarly to the loss weight map calculation in the learning phase. For example, when the luminance saturation or the blocked-up shadow occurs in a target pixel having a certain color component, the weight is set to 0 if the luminance saturation or the blocked-up shadow occurs in all the nearest pixels having the other colors, and the weight is set to 0 in the other case.

As described above, in this embodiment, the input image includes a plurality of color components. If the luminance saturation or the blocked-up shadow occurs in the target pixel of the input image and all the pixels having color components different from that in the target pixel within a predetermined area (for example, nearest area), the weight map is generated so that the weight in the input image at the position of the target pixel is larger than the output from the neural network. On the other hand, if the luminance saturation or the blocked-up shadow does not occur in any of the target pixel of the input image and/or the pixels having color components different from that in the target pixel within the predetermined area, the weight map is generated so that the weight in the input image at the position of the target pixel is less than the output from the neural network.

Blurring processing may be performed to reduce discontinuity in the calculated weight map, or the weight map may be generated by another method. The weight map may be generated any time between the step S401 and the step S406.

Subsequently in the step S406, the generator 303c weights and averages the input image and the estimated image based on the weight map and generates a weighted average image. That is, the generator 303c generates the weighted average image based on the output from the neural network (the estimated image or a residual image), the input image, and the weight map. The weighted average image is generated by taking the sum of a product of the weight map and each element in the estimated image, and a product of the map obtained by subtracting the weight map from the map of all the elements and each element in the input image. Instead of the step S406, by using the weight map, an estimated image may be generated where the input image has replaced an area in the estimated image likely to have false configuration, when the skip connection 521 takes the sum of the input image and the residual image in the step S404. In this case, pixels likely to have the false configuration, that is indicated by the weight map, are set to an input image, and the other pixels are set as the sum of the input image and the residual image. By performing the same processing, the learning phase can also exclude areas likely to have false configuration from the loss function in the step S305.

This embodiment can provide an image processing system that can deblur with high accuracy even when the luminance saturation or blocked-up shadow occurs.

Thus, in the first and the second embodiments, an obtaining unit (obtainer 123a; obtainer 303b, and generator 303c) obtains a map outside a dynamic range of an input image based on a signal value in the input image and thresholds of the signal value. A processing unit (detector 123b; generator 303c) inputs input data including the input image and the map outside the dynamic range to a neural network, and executes a recognition task or a regression task.

Third Embodiment

A description will now be given of an image processing system in a third embodiment of the present invention. The image processing system in this embodiment is different from the first and second embodiments in that the image processing system includes a processing apparatus (computer) configured to transmit a captured image (input image) to be processed to an image estimating apparatus and to receive a processed output image from an image estimating apparatus.

Figure 15:
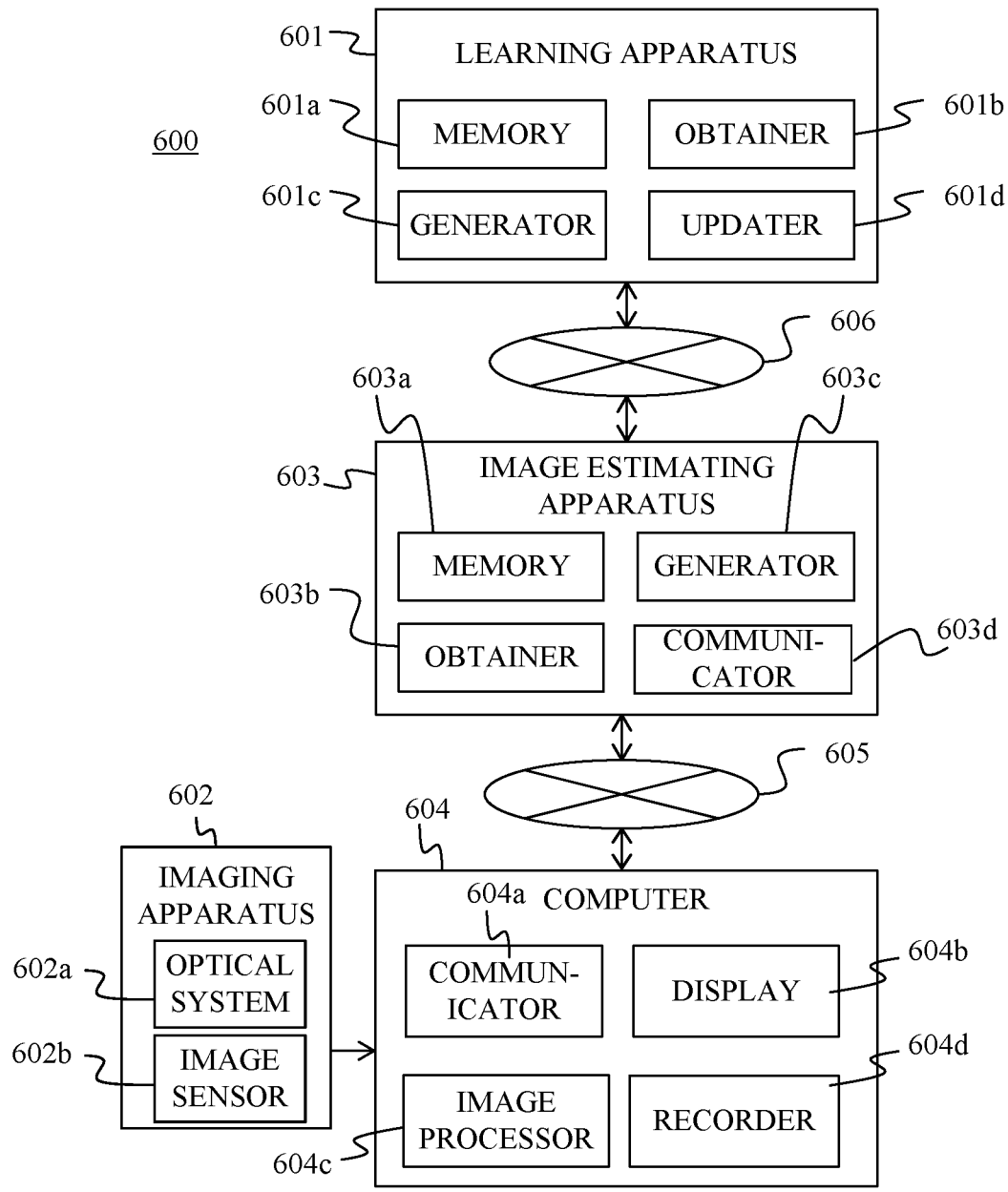
FIG. 15 is a block diagram of an image processing system according to a third embodiment.

FIG. 15 is a block diagram of an image processing system 600 in this embodiment. The image processing system 600 includes a learning apparatus 601, an imaging apparatus 602, an image estimating apparatus 603, and a processing apparatus (computer) 604. The learning apparatus 601 and the image estimating apparatus 603 are, for example, servers. The computer 604 is, for example, a user terminal (a personal computer or a smartphone). A network 605 connects the computer 604 and the image estimating apparatus 603. A network 606 connects the image estimating apparatus 603 and the learning apparatus 601. That is, the computer 604 and the image estimating apparatus 603 are configured to be communicable, and the image estimating apparatus 603 and the learning apparatus 601 are configured to be communicable. The computer 604 corresponds to a first apparatus, and the image estimating apparatus 603 corresponds to a second apparatus. The configuration of the learning apparatus 601 is the same as that of the learning apparatus 301 in the second embodiment, and therefore a description thereof will be omitted. The configuration of the imaging apparatus 602 is the same as that of the imaging apparatus 302 in the second embodiment, and therefore a description thereof will be omitted.

The image estimating apparatus 603 includes a memory 603a, an obtainer (obtaining unit) 603b, a generator (processing unit) 603c, and a communicator (receiving unit and transmitting unit) 603d. The memory 603a, the obtainer 603b, and the generator 603c are the same as the memory 103a, the obtainer 103b, and the generator 103c in the image estimating apparatus 303 in the second embodiment, respectively. The communicator 603d has a function of receiving a request transmitted from the computer 604 and a function of transmitting an output image generated by the image estimating apparatus 603 to the computer 604.

The computer 604 includes a communicator (transmitting unit) 604a, a display 604b, an image processor 604c, and a recorder 604d. The communicator 604a has a function of transmitting a request for making the image estimating apparatus 603 execute processing on the captured image to the image estimating apparatus 603, and a function of receiving an output image processed by the image estimating apparatus 603. The display 604b has a function of displaying various information. The information displayed by the display 604b includes, for example, the captured image to be transmitted to the image estimating apparatus 603 and the output image received from the image estimating apparatus 603. The image processor 604c has a function of performing further image processing on the output image received from the image estimating apparatus 603. The recorder 604d records the captured image obtained from the imaging apparatus 602, the output image received from the image estimating apparatus 603, and the like.

Figure 16:
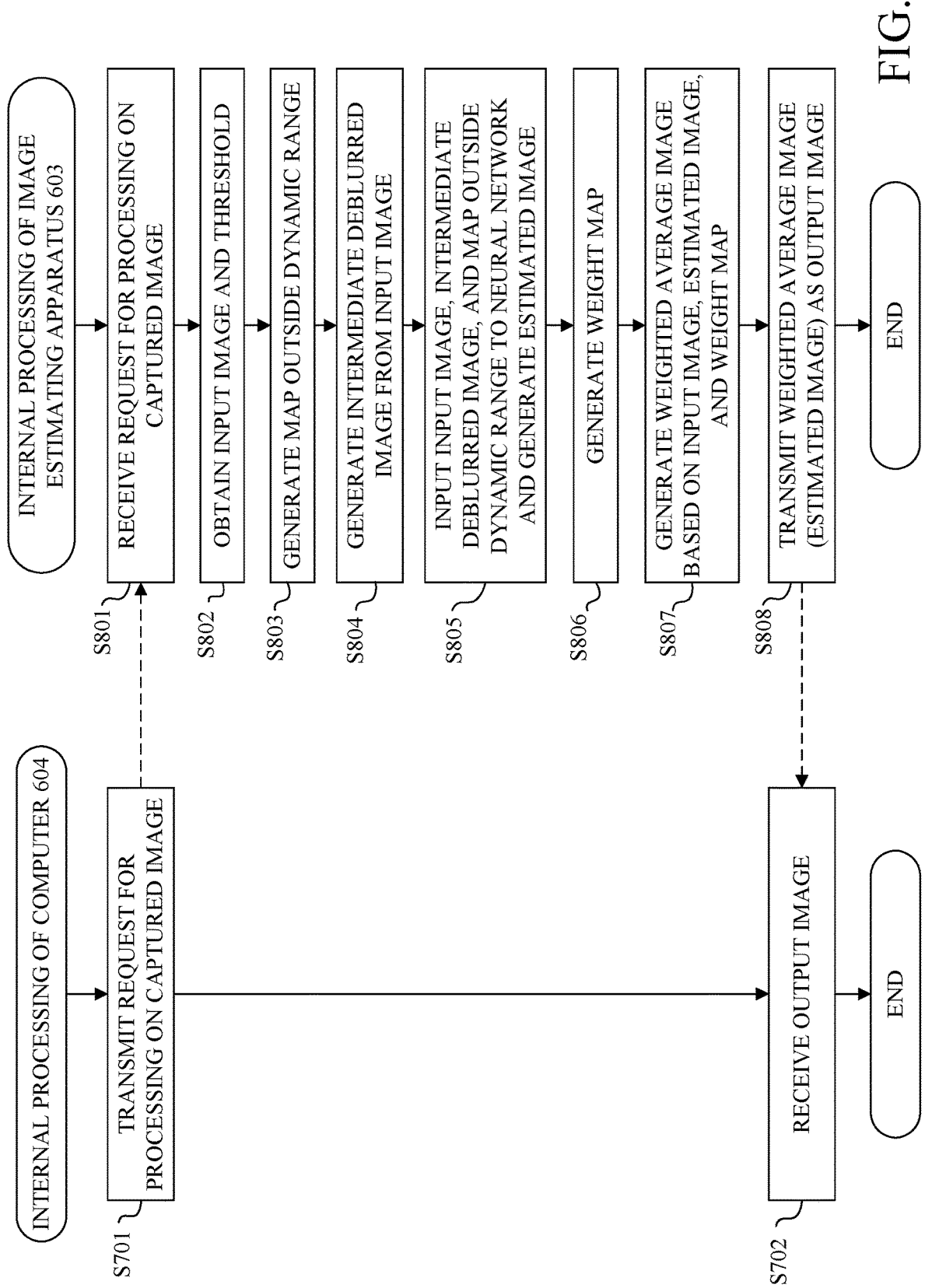
FIG. 16 is a flowchart relating to generation of an output image according to the third embodiment.

Referring now to FIG. 16, a description will be given of image processing in this embodiment. The image processing in this embodiment is equivalent to the deblurring processing (FIG. 14) described in the second embodiment. FIG. 16 is a flowchart relating to generation of an output image. The image processing illustrated in FIG. 16 starts when a user issues an instruction to start image processing via the computer 604. First, the operation in the computer 604 will be described.

In the step S701, the computer 604 transmits a request for processing on the captured image to the image estimating apparatus 603. It does not a matter how the captured image to be processed is transmitted to the image estimating apparatus 603. For example, the captured image may be uploaded from the computer 604 to the image estimating apparatus 603 at the same time as the step S701, or may be uploaded to the image estimating apparatus 603 before the step S701. Instead of the image recorded on the computer 604, the captured image may be an image stored on a server different from the image estimating apparatus 603. In the step S701, the computer 604 may transmit ID information or the like for authenticating the user together with the request for the processing on the captured image. In the step S702, the computer 604 receives the output image generated in the image estimating apparatus 603. The output image is an estimated image which is obtained by deblurring the captured image similarly to that in the second embodiment.

A description will now be given of operation for the image estimating apparatus 603. In the step S801, the image estimating apparatus 603 receives a request for processing on a captured image transmitted from the computer 604. The image estimating apparatus 603 determines that the processing (deblurring processing) for the captured image has been instructed, and executes processing following the step S802. The steps S802 to S807 are the same as the steps S401 to S406 in the second embodiment. In the step S808, the image estimating apparatus 603 transmits an estimated image (weighted average image), that is a result of a regression task, to the computer 604 as an output image.

Although it has been described that this embodiment performs deblurring processing similarly to that in the second embodiment, this embodiment can be similarly applied to the person area detection (FIG. 7) in the first embodiment. This embodiment has described that the image estimating apparatus 603 performs all the processing corresponding to the steps S401 to S406 in the second embodiment, but the present invention is not limited to this embodiment. For example, the computer 604 may perform one or more of the steps S401 to S406 in the second embodiment (corresponding to the steps S802 to S807 in this embodiment), and may transmit the result to the image estimating apparatus 603.

As described in this embodiment, the image estimating apparatus 603 may be controlled using the computer 604 communicably connected to the image estimating apparatus 603.

For example, the regression task in each embodiment is to shape a defocus blur in a captured image. Shaping the defocus blur is a task for converting, into a blur with the arbitrary distribution, double-line blur, vignetting, annular pattern caused by an aspheric lens mold, a ring-shaped defocus blur of a mirror lens, etc. At this time, a problem may occur in an area where information is lost due to the luminance saturation or blocked-up shadow. However, by inputting the map outside the dynamic range to the neural network, it is possible to execute the shaping for the defocus blur while the side effect is suppressed.

Other Embodiments

Embodiment(s) of the present invention can also be realized by a computer of a system or apparatus that reads out and executes computer executable instructions (e.g., one or more programs) recorded on a memory medium (which may also be referred to more fully as a 'non-transitory computer-readable memory medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the memory medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the memory medium. The memory medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The above embodiments can provide an image processing method, an image processing apparatus, a program, an image processing system and a learnt model manufacturing method, each of which can suppress a decrease in estimation accuracy of a neural network even when the luminance saturation or blocked-up shadow occurs.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent configurations and functions.

This application claims the benefit of Japanese Patent Application No. 2019-067279, filed on Mar. 29, 2019 which is hereby incorporated by reference herein in its entirety.

What is claimed is:

1. An image processing method comprising steps of:
   obtaining an input image that is at least part of a captured image obtained by an image sensor;
   obtaining a first map representing a region outside a dynamic range of the input image based on a signal value in the input image and a threshold of the signal value; and
   inputting input data including the input image and the first map to a neural network and executing a recognition task or a regression task,
   wherein the threshold of the signal value is set based on at least one of a luminance saturation value and a black level in the input image that is the at least part of the captured image obtained by the image sensor, and
   wherein the input data is obtained by concatenating the input image and the first map in a channel direction.

2. The image processing method according to claim 1, wherein the first map is a map representing at least one of a luminance saturated area and a blocked-up shadow area in the input image.

3. The image processing method according to claim 1, wherein the input data includes the input image and the first map as a channel component.

4. The image processing method according to claim 3, wherein the inputting step inputs only one of the input image and the first map to a first layer of the neural network, concatenates, in a channel direction, a feature map that is an output from at least the first layer, with the other of the input image and the first map that has not been input to the first layer, and inputs concatenated data to a subsequent layer of the neural network.

5. The image processing method according to claim 3, wherein the inputting step branches an input part of the neural network, converts the input image and the first map into feature maps in different layers, concatenates the feature maps, and inputs that to a subsequent layer.

6. The image processing method according to claim 1, wherein pixel numbers per one channel are equal to each other between the input image and the first map.

7. The image processing method according to claim 1, wherein the task is to deblur the input image.

8. The image processing method according to claim 1, further comprising steps of:
   obtaining a weight map based on the signal value in the input image and the threshold of the signal value; and
   generating a weighted average image based on the output from the neural network, the input image, and the weight map.

9. The image processing method according to claim 8, wherein the input image includes a plurality of color components, and
   wherein in the input image, when luminance saturation or a blocked-up shadow occurs in all of a target pixel and pixels having a color component different from that of the target pixel in a predetermined area, the weight map is generated so that a weight at a position of the target pixel in the input image is larger than the output from the neural network.

10. The image processing method according to claim 8, wherein the input image has a plurality of color components, and
    wherein in the input image, when neither luminance saturation nor a blocked-up shadow occurs in any of the target pixel and a pixel having a color component different from that of the target pixel in the predetermined area, the weight map is generated so that a weight at the position of the target pixel in the input image is smaller than the output from the neural network.

11. An image processing apparatus comprising:
    an obtaining unit configured to obtain (i) an input image that is at least part of a captured image obtained by an image sensor and (ii) a first map representing a region outside a dynamic range of the input image based on a signal value in the input image and a threshold of the signal value; and
    a processing unit configured to input data including the input image and the first map to a neural network, and to execute a recognition task or a regression task,
    wherein the threshold of the signal value is set based on at least one of a luminance saturation value and a black level in the input image that is the at least part of the captured image obtained by the image sensor,
    wherein the input data is obtained by concatenating the input image and the first map in a channel direction, and
    wherein at least one processor or circuit is configured to perform a function of at least one of the units.

12. The image processing apparatus according to claim 11, further comprising a memory configured to store weight information used in the neural network.

13. A non-transitory computer-readable storage medium storing a computer program that causes a computer to execute the image processing method according to claim 1.

14. An image processing system comprising:
a first apparatus; and
a second apparatus communicable with the first apparatus,
wherein the first apparatus includes a transmitter configured to transmit a request to make the second apparatus execute processing on a captured image obtained by an image sensor,
wherein the second apparatus includes:
a receiver configured to receive the request transmitted by the transmitter;
an obtainer configured to obtain (i) at least part of the captured image obtained by the image sensor and (ii) a first map representing a region outside a dynamic range of the captured image based on a signal value in the captured image and a threshold of the signal value;
a processor configured to input data including the captured image and the first map to a neural network and to execute a recognition task or a regression task; and
a transmitter configured to transmit a result of the executed task,
wherein the threshold of the signal value is set based on at least one of a luminance saturation value and a black level in the at least part of the captured image obtained by the image sensor, and
wherein the input data is obtained by concatenating the captured image and the first map in a channel direction.

15. An image processing method comprising steps of:
obtaining a training image that is at least part of a captured image obtained by an image sensor, a first map representing a region outside a dynamic range of the training image based on a signal value in the training image and a threshold of the signal value, and ground truth data; and
making a neural network learn for executing a recognition task or a regression task, using input data including the training image, the first map, and the ground truth data,
wherein the threshold of the signal value is set based on at least one of a luminance saturation value and a black level in the training image that is the at least part of the captured image obtained by the image sensor, and
wherein the input data is obtained by concatenating the training image and the first map in a channel direction.

16. A non-transitory computer-readable storage medium storing a computer program that causes a computer to execute the image processing method according to claim 15.

17. A learnt model manufacturing method comprising steps of:
obtaining a training image that is at least part of a captured image obtained by an image sensor, a first map representing a region outside a dynamic range of the training image based on a signal value in the training image and a threshold of the signal value, and ground truth data; and
making a neural network learn for executing a recognition task or a regression task using input data including the training image, the first map, and the ground truth data,
wherein the threshold of the signal value is set based on at least one of a luminance saturation value and a black level in the training image that is the at least part of the captured image obtained by the image sensor, and
wherein the input data is obtained by concatenating the training image and the first map in a channel direction.

18. An image processing apparatus comprising:
an obtaining unit configured to obtain a training image that is at least part of a captured image obtained by an image sensor, a first map representing a region outside a dynamic range of the training image based on a signal value in the training image and a threshold of the signal value, and ground truth data; and
a learning unit configured to make a neural network learn for executing a recognition task or a regression task using input data including the training image, the first map, and the ground truth data,
wherein the threshold of the signal value is set based on at least one of a luminance saturation value and a black level in the training image that is the at least part of the captured image obtained by the image sensor,
wherein the input data is obtained by concatenating the training image and the first map in a channel direction, and
wherein at least one processor or circuit is configured to perform a function of at least one of the units.

* * * * *